(No Model.)
T. FOULDS.
METALLIC RAILROAD TIE.
No. 443,939. Patented Dec. 30, 1890.
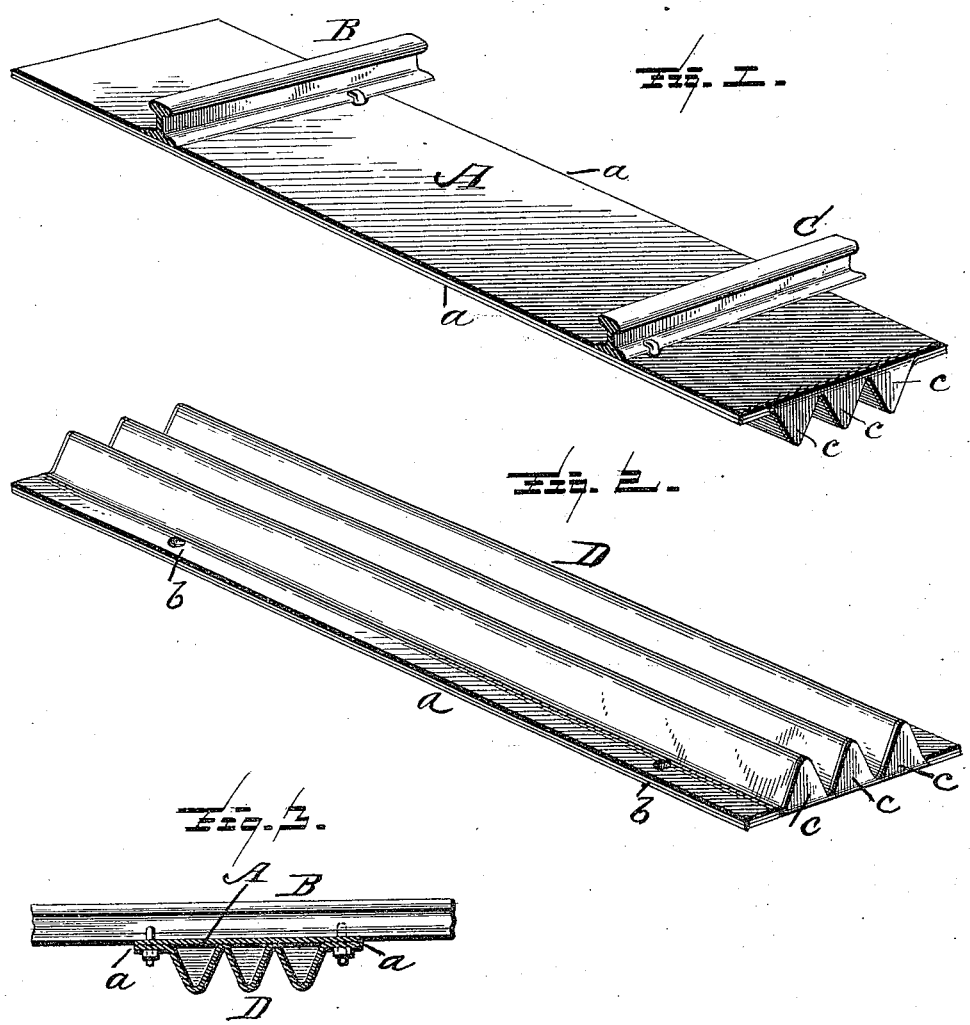
Witnesses
L. C. Hills.
Y. M. Copenhaver
Inventor
Thomas Foulds.
per Chas. H. Fowler
Attorney

UNITED STATES PATENT OFFICE.

THOMAS FOULDS, OF TREVORTON, PENNSYLVANIA, ASSIGNOR TO HIMSELF, WILLIAM GRAEBER, AND JOHN T. HEENAN, ALL OF SAME PLACE.

METALLIC RAILROAD-TIE.

SPECIFICATION forming part of Letters Patent No. 443,939, dated December 30, 1890.

Application filed October 18, 1890. Serial No. 368,581. (No model.)

*To all whom it may concern:*

Be it known that I, THOMAS FOULDS, a citizen of the United States, residing at Trevorton, in the county of Northumberland and State of Pennsylvania, have invented certain new and useful Improvements in Metallic Railroad-Ties; and I do hereby declare that the following is a full, clear, and exact description of the same, reference being had to the annexed drawings, making a part of this specification, and to the letters of reference marked thereon.

Figure 1 of the drawings represents a perspective view of my improved metallic railroad-tie; Fig. 2, an under side perspective view, and Fig. 3 a cross section thereof.

The present invention has relation to that class of metallic railroad-ties having a corrugated support; and the object thereof is to improve such ties in the several details of construction, whereby the tie will possess increased strength and durability and present a broad bearing-surface for the support of the rail and flanges for the convenient attachment of the rails, which objects are attained by the construction, substantially as shown in the drawings, and hereinafter described and claimed.

In the accompanying drawings, A represents a flat and broad supporting-plate for the rails B C, which plate is of such width as to present flanges *a* upon either side of the corrugated bearings D, which are preferably V shape in cross-section, as shown. The flanges *a*, formed by the extension of the plate A beyond the corrugated bearings D, are provided with holes *b* to receive bolts or other suitable fastenings for holding the rails to the plate.

The corrugated bearings, as above described, are for supporting and resisting any breaking strain or pressure thereon by the train moving over it, and the bearings are closed at their ends by caps *c* to exclude dirt or foreign bodies and also to add increased strength to the bearings and render their supporting-power materially enhanced.

The cross-tie herein described may be constructed of iron or steel or of any metal that may be found desirable, and may be of any preferred size in both width and length as circumstances require.

Having now fully described my invention, what I claim as new, and desire to secure by Letters Patent, is—

1. A metallic railroad-tie consisting of the broad supporting-plate A and corrugated bearings D, said plate extending beyond the bearings to present flanges *a* for attaching thereto the rails, substantially as and for the purpose set forth.

2. In a metallic railroad-tie, the combination, with the supporting-plate A, having extended sides to form flanges *a*, of the corrugated bearings D, closed at their ends by caps *c*, substantially as and for the purpose described.

In testimony that I claim the above I have hereunto subscribed my name in the presence of two witnesses.

THOMAS FOULDS.

Witnesses:
GEO. W. JOHNS,
WILLIAM W. RYON.